(12) United States Patent
Kumano

(10) Patent No.: US 7,622,038 B2
(45) Date of Patent: Nov. 24, 2009

(54) FLUID ACTIVATION APPARATUS

(75) Inventor: Katsuyuki Kumano, Shibuya-ku (JP)

(73) Assignee: Japan System Planning Co., Ltd., Tokyo (JP)

( * ) Notice: Subject to any disclaimer, the term of this patent is extended or adjusted under 35 U.S.C. 154(b) by 640 days.

(21) Appl. No.: 11/217,889

(22) Filed: Sep. 1, 2005

(65) Prior Publication Data

US 2006/0059998 A1    Mar. 23, 2006

(30) Foreign Application Priority Data

Sep. 1, 2004    (JP)    ............... 2004-254157

(51) Int. Cl.
C02F 1/48    (2006.01)
(52) U.S. Cl. ............ 210/222; 210/695; 335/302; 335/303; 335/306
(58) Field of Classification Search ........... 210/222, 210/223, 695; 335/302, 303, 306
See application file for complete search history.

(56) References Cited

U.S. PATENT DOCUMENTS

| | | | |
|---|---|---|---|
| 5,055,189 A * | 10/1991 | Ito | 210/222 |
| 5,269,915 A | 12/1993 | Claire et al. | |
| 5,711,874 A * | 1/1998 | Kawata | 210/223 |
| 6,094,120 A * | 7/2000 | Okamoto | 210/222 |
| 7,229,561 B1 * | 6/2007 | Hamanaka et al. | 210/222 |

| | | |
|---|---|---|
| 2003/0196946 A1 * | 10/2003 | Denzer ............ 210/223 |

FOREIGN PATENT DOCUMENTS

| | | |
|---|---|---|
| EP | 0 444 A1 | 3/1999 |
| EP | 1 095 909 A1 | 5/2001 |
| EP | 1 500 428 A1 | 1/2005 |
| FR | 98 10374 A | 2/2000 |
| JP | 2-61494 A | 5/1990 |
| JP | PUB-5-018635 | 3/1993 |
| JP | 08-155442 A | 6/1996 |
| JP | 11-147089 A | 6/1999 |
| JP | PUB-2000-9290 | 1/2000 |
| JP | 2001-179263 A | 7/2001 |
| JP | 2002-126745 A | 5/2002 |

* cited by examiner

Primary Examiner—David A Reifsnyder
(74) Attorney, Agent, or Firm—Apex Juris, pllc; Tracy M. Heims

(57) ABSTRACT

Two assembled bodies arranged as a pair are disposed around the outside periphery of a pipe to activate water flowing in the pipe. Each of the assembled bodies is composed of a cover and fluid activating bodies integrally fixed in the cover with an epoxy resin. Each of the fluid activating bodies is composed of a black radiation sintered body made by sintering the powder of a plurality of kinds of metal oxides at high temperature and an electromagnetic wave converging body for converging the electromagnetic wave radiated from the black radiation sintered body to a predetermined wavelength. The two covers are disposed around the outside periphery of the pipe, and fixing portions formed on both the sides of the covers are integrally fixed by fixtures, respectively.

8 Claims, 4 Drawing Sheets

FIG. 2A
FIG. 2B
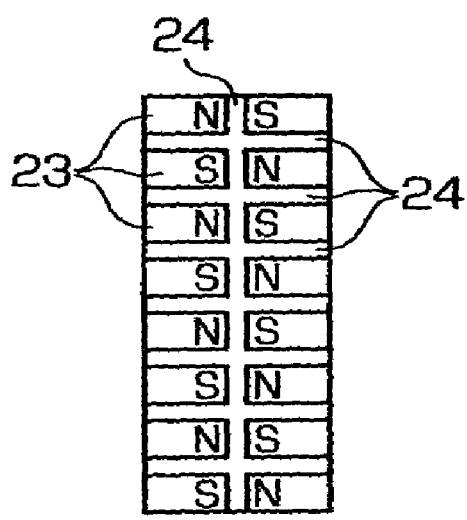
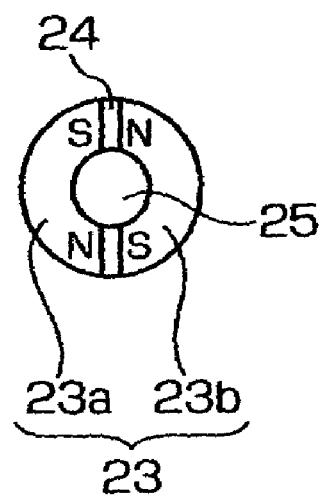

FIG. 4A
FIG. 4B
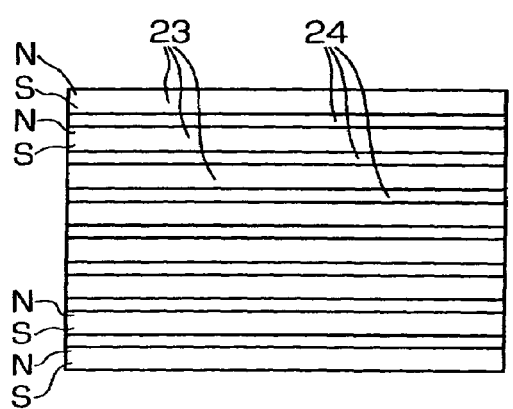
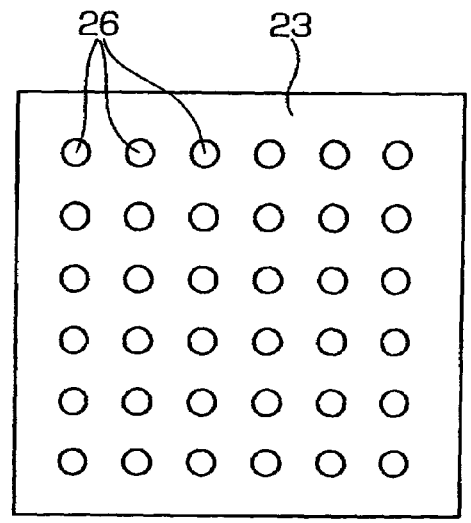

FLUID ACTIVATION APPARATUS

BACKGROUND OF THE INVENTION

1. Field of the Invention

The present invention relates to a fluid activation apparatus for activating a fluid flowing in a pipe by ionizing it.

2. Description of the Related Art

A conventional fluid activation apparatus is composed with a permanent magnet, a nuclear magnetic resonance energy generator, and the like disposed externally of a pipe (refer to, for example, Japanese Patent Application Publication No. 5-018635 and Japanese Patent Application Laid-Open No. 2000-009290).

To accelerate the activation of a fluid, it is preferable that a magnetic body have a larger magnetic density. However, since the magnetic body used in Japanese Patent Application Publication No. 5-018635 has a limit in the magnetic density, a sufficient effect cannot be expected. In contrast, since the apparatus disclosed in Japanese Patent Application Laid-Open No. 2000-009290 is constructed based on an NMR magnetic resonance theory, the apparatus can activate a fluid in a pipe very effectively. However, the apparatus disclosed in Japanese Patent Application Laid-Open No. 2000-009290 is disadvantageous in that it is very expensive because a special magnetic body is employed.

SUMMARY OF THE INVENTION

An object of the present invention is to provide a less expensive fluid activation apparatus capable of activating a fluid more effectively.

A first aspect of the present invention for resolving the above problems suggests a fluid activation apparatus comprising fluid activating bodies disposed around the outside periphery of a pipe to activate a fluid flowing in the pipe, wherein each of the fluid activating bodies is composed of:

a black radiation sintered body made by sintering the powder of a plurality of kinds of metal oxides at high temperature; and an electromagnetic wave converging body for converging the electromagnetic wave radiated from the black radiation sintered body to a predetermined wavelength.

A second aspect of the present invention for resolving the above problems suggests a fluid activation apparatus comprising fluid activating bodies disposed around the outside periphery of a pipe to activate a fluid flowing in the pipe, said fluid activation apparatus is composed of: two assembled bodies disposed around the outside periphery of a pipe, wherein each of the assembled bodies is composed of: a cover; and fluid activating bodies integrally fixed in the cover with a resin, and each of the fluid activating bodies is composed of: a black radiation sintered body made by sintering the powder of a plurality of kinds of metal oxides at high temperature; and an electromagnetic wave converging body for converging the electromagnetic wave radiated from the black radiation sintered body to a predetermined wavelength, wherein the two covers are disposed around the outside periphery of the pipe, and fixing portions formed on both the sides of the covers are integrally fixed by fixtures, respectively.

A third aspect of the present invention for resolving the above problems suggests a fluid activation apparatus according to the first or the second aspect, wherein the electromagnetic wave converging body is formed by laminating at least four magnets with the N-poles and the S-poles thereof disposed alternately, and an electromagnetic wave passing-through hole is formed to the laminated magnets so as to pass therethrough.

A fourth aspect of the present invention for resolving the above problems suggests a fluid activation apparatus according to the first or the second aspect, characterized in that the black radiation sintered body is formed by twelve kinds of materials. There are seven main components, namely Cobalt, Nickel, Manganese, Copper, Iron, Boron and Aluminum. The main components mixed with five kinds of metal oxides of the group consisting of Neodymium, Praseodymium, Yttrium, Lanthanum, Cerium, Samarium, Europium, Gadolinium, Terbium, Dysprosium, Holmium, Erbium, Thulium, Ytterbium, Lutetium and Chromium.

A fifth aspect of the present invention for resolving the above problems suggests a fluid activation apparatus according to the third aspect, wherein each the magnets are integrally coupled with each other by a non-magnetic cover.

A sixth aspect of the present invention for resolving the above problems suggests a fluid activation apparatus according to the third aspect, wherein the electromagnetic wave passing-through hole is formed of a fine hole having a diameter of 1 mm or less.

The black radiation sintered body generates an electromagnetic wave having a wide wavelength. The electromagnetic wave having the wide wavelength loses its permeability to a substance as soon as it is damped by the mutual action between phases. However, a specific laser-like microwave can be obtained from the electromagnetic wave radiated from the black radiation sintered body because the phases of the wavelength of the electromagnetic wave are aligned when the electromagnetic wave is converged by an electromagnetic wave converging body. The laser-like microwave passes through a pipe, thereby water flowing in a pipe can be activated.

BRIEF DESCRIPTION OF THE DRAWINGS

FIG. 2A is a front elevational view of an electromagnetic wave converging body shown in FIG. 1;

FIG. 2B is a plan view of the electromagnetic wave converging body;

FIG. 4A is a front elevational view of an electromagnetic wave converging body shown in FIG. 3; and FIG. 4B is a plan view of the electromagnetic wave converging body.

DESCRIPTION OF THE PREFERRED EMBODIMENTS

Figure 1A:
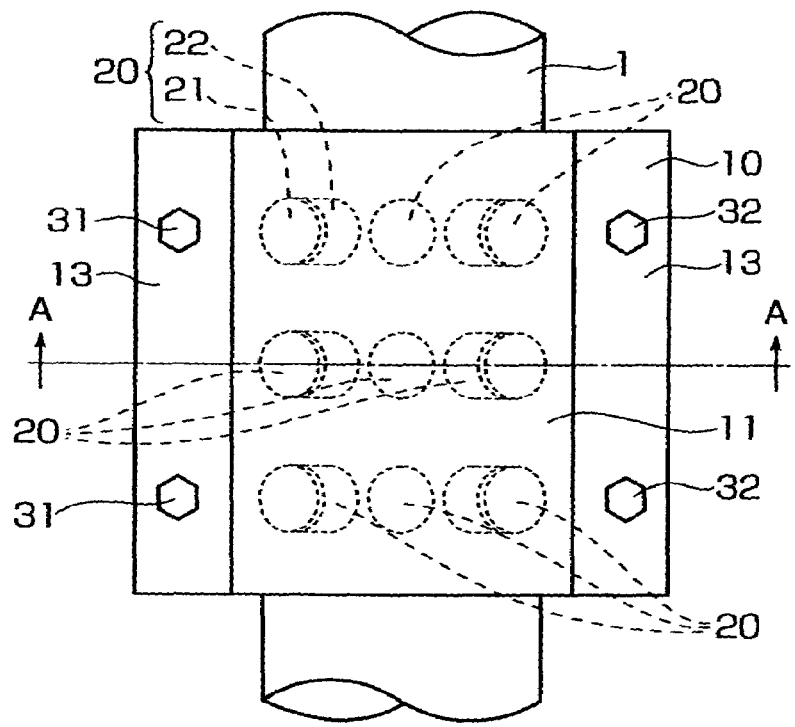
FIG. 1A is a front elevational view showing a first embodiment of a fluid activation apparatus of the present invention.
Figure 1B:
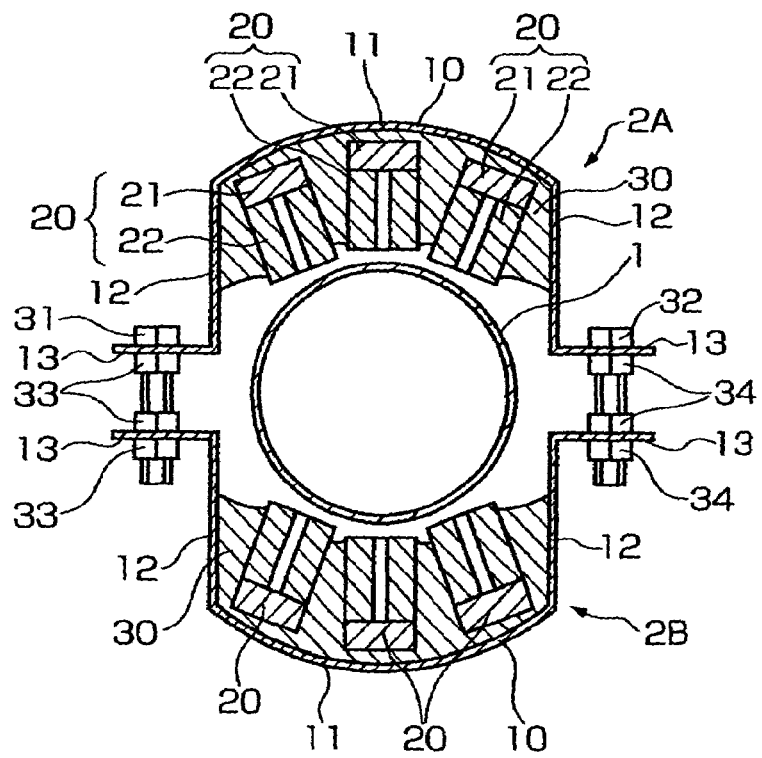
FIG. 1B is a sectional view of the fluid activation apparatus taken along the line A-A of FIG. 1A.

A first embodiment of a fluid activation apparatus of the present invention will be explained with reference to FIGS. 1A, 1B, 2A, and 2B. Two assembled bodies 2A and 2B arranged as a pair are disposed around the outer periphery of a pipe 1. Since the assembled bodies 2A and 2B have the same structure, the same components and the same portions used in them are denoted by the same reference numerals omitting symbols A and B therefrom, and explanation will be made adding the symbols to the ends of the reference numerals when necessary.

Each of the assembled bodies 2A and 2B has a plurality of fluid activating bodies 20 fixed in a stainless steel cover 10. The arrangement of the fluid activating bodies 20 will be described later. The cover 10 is formed of an arc-shaped outside wall 11, side walls 12 extending from both the side ends of the outside wall 11 toward the pipe 1, and fixing portions 13 extending from the side walls 12 at right angles externally of the pipe 1. The fluid activating bodies 20 are fixed integrally in the cover 10 by an epoxy resin 30. The assembled bodies 2A and 2B arranged as described above are disposed around the outer periphery of the pipe 1 and fixed to the pipe 1 by being tightened by nuts 33 and 34 screwed on bolts 31 and 32 passing through the fixing portions 13.

Each of the fluid activating bodies 20 is composed of a black radiation sintered body 21 and an electromagnetic wave converging body 22 for converging the wavelengths of an electromagnetic wave generated by the black radiation sintered body 21 to a specific wavelength.

The black sintered radiation body 21 is formed by making plural kinds of metal oxides to powder and sintering the powder at 1000 to 1400° C. The material of the metal oxides above includes Cobalt, Nickel, Manganese, Copper, Iron, Boron and Aluminum as main components, which are mixed with five kinds of metal oxides of the group consisting of Neodymium, Praseodymium, Yttrium, Lanthanum, Cerium, Samarium, Europium, Gadolinium, Terbium, Dysprosium, Holmium, Erbium, Thulium, Ytterbium, Lutetium and Chromium.

As shown in FIG. 2, the electromagnetic wave converging body 22 is composed of multiple layers (eight layers in the embodiment) of divided magnets 23a and 23b which are obtained by dividing ring-shaped magnets 23 into two portions and laminated. The magnets 23 have N-poles and S-poles disposed thereto alternately and are coupled integrally with each other by a non-magnetic cover 24. With the above arrangement, a fine electromagnetic wave passing-through hole 25 having a diameter of 1 mm or less is formed at the center of the electromagnetic wave converging body 22.

Next, an operation of the fluid activation apparatus will be described. The black radiation sintered body 21 generates an electromagnetic wave having a wide wavelength. The electromagnetic wave having the wide wavelength loses its permeability to a substance as soon as it is damped by the mutual action between phases. Accordingly, when the black radiation sintered body 21 is caused to be in direct contact with water, it can activate the water. However, since the electromagnetic wave of the black radiation sintered body 21 does not pass through the pipe 1, it cannot activate water flowing in the pipe 1. In the embodiment, the phases of the wavelength of the electromagnetic wave radiated from the black radiation sintered body 21 is aligned by causing the electromagnetic wave to pass through the electromagnetic wave passing-through hole 25 of the magnets 23 in which the N-poles and the S-poles are alternately disposed, thereby a specific laser-like microwave is obtained. The laser-like microwave passes through the pipe 1 and can activate the water flowing in the pipe 1. When the water is activated, the red rust deposited on the inside wall of the pipe 1 is changed to black rust as known well. As a result, the closing ratio of the pipe 1 is improved, and the deterioration of the pipe 1 due to red rust corrosion can be prevented.

As described above, since each of the fluid activating bodies 20 is composed of the black radiation sintered body 21 made by sintering metal oxides and the electromagnetic wave converging body 22 composed of the magnets 23 for converging electromagnetic wave generated by the black radiation sintered body 21 for converging the electromagnetic wave generated from the black radiation sintered body 21 to a specific wavelength, the cost of the fluid activating bodies 20 can be greatly reduced than the special nuclear magnetic resonance energy generator used in Japanese Patent Application Laid-Open No. 2000-009290.

Figure 3A:
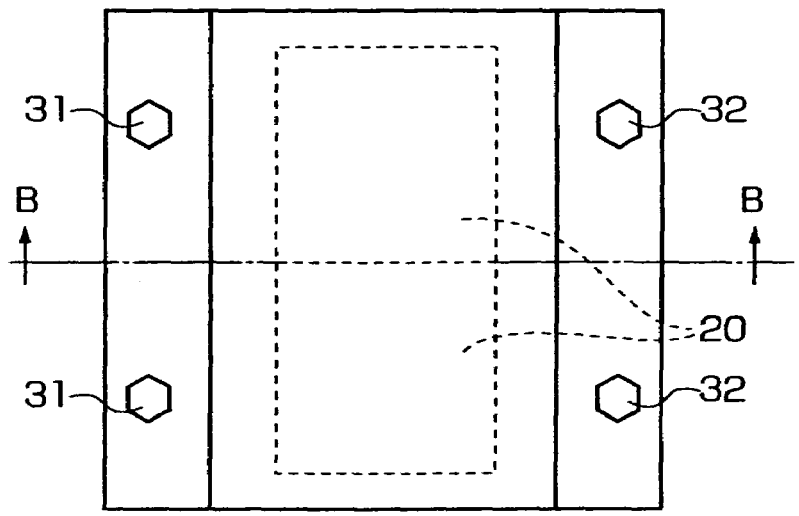
FIG. 3A is a front elevational view showing a second embodiment of the fluid activation apparatus of the present invention.
Figure 3B:
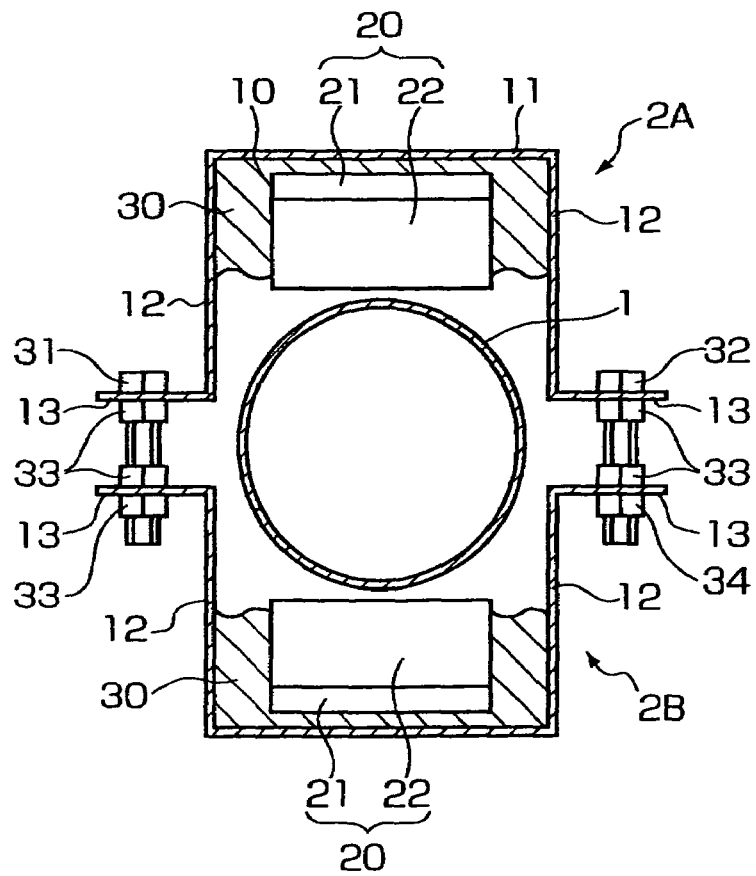
FIG. 3B is a sectional view of the fluid activation apparatus taken along the line B-B of FIG. 3A.

A second embodiment of the fluid activation apparatus of the present invention will be explained with reference to FIGS. 3A, 3B, 4A, and 4B. Note that, in the second embodiment, the same members as and members corresponding to the members used in the first embodiment are denoted by the same reference numerals, and the detailed description thereof is not repeated. An electromagnetic wave converging body is formed by laminating magnets 23 in multiple layers (eight layers in the second embodiment). The magnets 23 have N-poles and S-poles disposed alternately and are integrally coupled with each other by a non-magnetic cover 24. A multiplicity of fine electromagnetic wave passing-through holes 26 each having a diameter of 1 mm or less are formed to the electromagnetic wave converging body 22 so as to pass therethrough.

Also in the second embodiment, when the electromagnetic wave radiated from a black radiation sintered body 21 is passed through the electromagnetic wave passing-through holes 26 of the magnets 23 in which the N-poles and the S-poles are alternately disposed, the phases of the wavelength of the electromagnetic wave are aligned, thereby a specific laser-like microwave is obtained. The laser-like microwave passes through the pipe 1 and can activate the water flowing in the pipe 1.

Note that although the case in which the eight magnets 23 are laminated is explained in the first and second embodiments, it is preferable that six magnets or more but at least four magnets are laminated.

What is claimed is:

1. A fluid activation apparatus comprising fluid activating bodies disposed around the outside periphery of a pipe to activate a fluid flowing in the pipe, wherein each of the fluid activating bodies is composed of:
    a black radiation sintered body made by sintering a resultant powder from a mixture of plural kinds of materials including metal oxides at high temperature; and
    an electromagnetic wave converging body for converging the electromagnetic wave radiated from the black radiation sintered body to a predetermined wavelength, wherein
    the electromagnetic wave converging body is formed by laminating at least four magnets with the N-poles and the S-poles thereof disposed alternately, and an electromagnetic wave passing-through hole is formed to the laminated magnets so as to pass therethrough.

2. A fluid activation apparatus according to claim 1, wherein
    the black radiation sintered body is formed by mixing seven main materials consisting of Cobalt, Nickel, Manganese, Copper, Iron, Boron and Aluminum with five kinds of metal oxides of the group consisting of Neodymium, Praseodymium, Yttrium, Lanthanum, Cerium, Samarium, Europium, Gadolinium, Terbium, Dysprosium, Holmium, Erbium, Thulium, Ytterbium, Lutetium and Chromium.

3. A fluid activation apparatus according to claim 1, wherein each the magnets are integrally coupled with each other by a non-magnetic cover.

4. A fluid activation apparatus according to claim 1, wherein the electromagnetic wave passing-through hole is formed of a fine hole having a diameter of 1 mm or less.

5. A fluid activation apparatus, comprising fluid activating bodies disposed around the outside periphery of a pipe to activate a fluid flowing in the pipe, said fluid activation apparatus is composed of:

two assembled bodies disposed around the outside periphery of a pipe, wherein each of the assembled bodies has a cover and fluid activating bodies integrally fixed in the cover by a resin, and each of the fluid activating bodies is composed of: a black radiation sintered body made by sintering a resultant powder from a mixture of plural kinds of material including metal oxides at high temperature; and an electromagnetic wave converging body for converging the electromagnetic wave radiated from the black radiation sintered body to a predetermined wavelength, said two covers are disposed around the outside periphery of the pipe, and fixing portions formed on both the sides of the covers are integrally fixed by fixtures, respectively, wherein the electromagnetic wave converging body is formed by laminating at least four magnets with the N-poles and the S-poles thereof disposed alternately, and an electromagnetic wave passing-through hole is formed to the laminated magnets so as to pass therethrough.

6. A fluid activation apparatus according to claim 5, wherein the black radiation sintered body is formed by mixing seven main materials consisting of Cobalt, Nickel, Manganese, Copper, Iron, Boron and Aluminum as main components with five kinds of metal oxides of the: group consisting of Neodymium, Praseodymium, Yttrium, Lanthanum, Cerium, Samarium, Europium, Gadolinium, Terbium, Dysprosium, Holmium, Erbium, Thulium, Ytterbium, Lutetium and Chromium.

7. A fluid activation apparatus according to claim 5, wherein each the magnets are integrally coupled with each other by a non-magnetic cover.

8. A fluid activation apparatus according to claim 5, wherein the electromagnetic wave passing-through hole is formed of a fine hole having a diameter of 1 mm or less.

* * * * *